United States Patent
Dwivedi et al.

(10) Patent No.: US 12,267,796 B2
(45) Date of Patent: Apr. 1, 2025

(54) RX-TX TIME DIFFERENCE GENERATION, MEASUREMENT AND REPORTING WITH NEIGHBORING BASE STATIONS

(71) Applicant: TELEFONAKTIEBOLAGET LM ERICSSON (PUBL), Stockholm (SE)

(72) Inventors: Satyam Dwivedi, Solna (SE); Fredrik Gunnarsson, Linköping (SE); Erik Dahlman, Stockholm (SE); Erik Stare, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 17/768,167

(22) PCT Filed: Oct. 10, 2020

(86) PCT No.: PCT/IB2020/059533
§ 371 (c)(1),
(2) Date: Apr. 11, 2022

(87) PCT Pub. No.: WO2021/070148
PCT Pub. Date: Apr. 15, 2021

(65) Prior Publication Data
US 2024/0107474 A1    Mar. 28, 2024

Related U.S. Application Data

(60) Provisional application No. 62/913,613, filed on Oct. 10, 2019.

(51) Int. Cl.
*H04W 56/00* (2009.01)
(52) U.S. Cl.
CPC ..... *H04W 56/002* (2013.01); *H04W 56/0055* (2013.01)

(58) Field of Classification Search
CPC .................. H04W 56/002; H04W 56/0055
See application file for complete search history.

(56) References Cited

U.S. PATENT DOCUMENTS 8,954,089 B2 * 2/2015 Werner ............... G01S 5/10
455/414.1
9,491,575 B2 * 11/2016 Edge ............... G01S 5/0081
(Continued)

FOREIGN PATENT DOCUMENTS

WO    2019122080 A1    6/2019

OTHER PUBLICATIONS

3GPP, "3rd Generation Partnership Project; Technical Specification Group Radio Access Network; NG Radio Access Network (NG-RAN); Stage 2 functional specification of User Equipment (UE) positioning in NG-RAN (Release 15)", TS 38.305 V15.4.0, Jun. 2019.

*Primary Examiner* — Bailor C Hsu
(74) *Attorney, Agent, or Firm* — Sage Patent Group

(57) ABSTRACT

A method performed by a first base station for positioning in a cellular communication system includes receiving, at the first base station, a signal transmitted by a second base station and estimating a Time of Arrival (TOA) of the received signal at the first base station according to a clock of the first base station. The method further includes determining a delta value that is a function of an amount of time between the TOA of the received signal at the first base station and a time reference at the first base station and performing either, (a) providing the delta value to a positioning estimation entity within the cellular communications system or (b) using the delta value at the first base station to reduce a time synchronization error between the first base station and the second base station, or (c) passing the delta value to a User Equipment (UE).

24 Claims, 12 Drawing Sheets

(56) References Cited

U.S. PATENT DOCUMENTS

| | | | | |
|---|---|---|---|---|
| 9,720,070 | B2* | 8/2017 | Choi | G01S 5/10 |
| 10,396,883 | B2* | 8/2019 | Radulescu | H04W 88/06 |
| 10,859,595 | B2* | 12/2020 | Kommi | G01S 5/0036 |
| 11,582,629 | B2* | 2/2023 | Manolakos | H04L 5/0091 |
| 2014/0323152 | A1 | 10/2014 | Zhang et al. | |
| 2015/0350850 | A1* | 12/2015 | Edge | H04W 88/02 |
| | | | | 455/456.1 |
| 2017/0238298 | A1* | 8/2017 | Wang | H04W 72/1268 |
| | | | | 455/452.1 |
| 2019/0045477 | A1 | 2/2019 | Edge | |
| 2019/0082288 | A1* | 3/2019 | Kumar | H04W 64/00 |
| 2022/0334215 | A1* | 10/2022 | Thompson | G01C 21/3815 |
| 2023/0008390 | A1* | 1/2023 | Zorgui | H04W 4/023 |

* cited by examiner

RX-TX TIME DIFFERENCE GENERATION, MEASUREMENT AND REPORTING WITH NEIGHBORING BASE STATIONS

RELATED APPLICATIONS

This application is a national stage application of International Patent Application No. PCT/IB2020/059533, filed Oct. 10, 2020, which claims the benefit of U.S. Provisional Pat. App. No. 62/913,613, filed Oct. 10, 2019, the disclosure of which are incorporated in their entirety by reference.

TECHNICAL FIELD

The present disclosure relates to positioning in a cellular communications system.

BACKGROUND

FIG. 1 is a reproduction of FIGS. 5.1-1 of Third Generation Partnership Project (3GPP) Technical Specification (TS) 38.305 V15.4.0, which shows the network architecture for positioning purposes. As illustrated, the Fifth Generation (5G) System (5GS) architecture for positioning purposes includes a Next Generation Radio Access Network (NG-RAN) including a next generation Node B (gNB) and a next generation enhanced or evolved Node B (ng-eNB), and a 5G Core (5GC) including an Access and Mobility Management Function (AMF) and a Location Management Function (LMF). The LMF may have a signaling connection to an Evolved Serving Mobile Location Center (E-SMLC) and a Secure User Plane Location (SUPL) Location Platform (SLP). Regarding this architecture, Section 5.1 of 3GPP TS 38.305 V15.4.0 states:

FIGS. 5.1-1 shows the architecture in 5GS applicable to positioning of a UE with NG-RAN or E-UTRAN access.

The AMF receives a request for some location service associated with a particular target UE from another entity (e.g., GMLC) or the AMF itself decides to initiate some location service on behalf of a particular target UE (e.g., for an IMS emergency call from the UE) as described in TS 23.502 [26]. The AMF then sends a location services request to an LMF. The LMF processes the location services request which may include transferring assistance data to the target UE to assist with UE-based and/or UE-assisted positioning and/or may include positioning of the target UE. The LMF then returns the result of the location service back to the AMF (e.g., a position estimate for the UE. In the case of a location service requested by an entity other than the AMF (e.g., a GMLC), the AMF returns the location service result to this entity.

An ng-eNB may control several TPs, such as remote radio heads, or PRS-only TPs for support of PRS-based TBS for E-UTRA.

An LMF may have a signalling connection to an E-SMLC which may enable an LMF to access information from E-UTRAN (e.g. to support the OTDOA for E-UTRA positioning method using downlink measurements obtained by a target UE of signals from eNBs and/or PRS-only TPs in E-UTRAN). Details of the signalling interaction between an LMF and E-SMLC are outside the scope of this specification.

An LMF may have a signalling connection to an SLP. The SLP is the SUPL entity responsible for positioning over the user plane. Further details of user-plane positioning are provided in [15] [16].

[Showing FIG. 5.1.-1 reproduced herein as FIG. 1.]

NOTE 1: The gNB and ng-eNB may not always both be present.

NOTE 2: When both the gNB and ng-eNB are present, the NG-C interface is only present for one of them (FFS).

There currently exist certain challenge(s). In the existing positioning methods, estimating position is either dependent on time synchronization among base stations for Downlink Time Difference of Arrival (DL-TDOA)-based methods or transmission from the User Equipment (UE) for estimating the UE's position for Round Trip Time (RTT)-based methods. Both these dependencies are not conducive for network operations. Uplink (UL)-based methods have difficulties reaching a required multitude of base stations with good enough Signal to Noise Ratio (SNR). Also, with an increasing number of UEs transmitting in the UL, the overhead for positioning may be increased to an unacceptable degree. Time synchronization in the cellular network is done by information exchange among base stations, where base stations try to synchronize themselves based on signal exchanges. The typical precision of time synchronization available in the network is 3 microseconds ($\mu s$). The timing uncertainty of 3 $\mu s$ is fine for communication. However, a timing error of 3 $\mu s$ can lead to a positioning error of up to 900 meters. Hence, there is a need for systems and methods that circumvent this timing error.

SUMMARY

Systems and methods related to positioning in a cellular communications system are disclosed. In one embodiment, a method performed by a first base station in a radio access network of a cellular communications system comprising receiving, at the first base station, a signal transmitted by a second base station and estimating a Time of Arrival (TOA) of the received signal at the first base station according to a clock of the first base station. The method further comprises determining a delta value that is or is a function of an amount of time between the TOA of the received signal at the first base station according to the clock of the first base station and a time reference at the first base station and either (a) providing the delta value to a positioning estimation entity within the cellular communications system or (b) using the delta value at the first base station to reduce a time synchronization error between the first base station and the second base station, or (c) passing the delta value to a User Equipment (UE). In this manner, the need for very precise time synchronization for positioning can be alleviated by accounting for delay errors between transmissions of base stations.

In one embodiment, receiving the signal comprises receiving the signal via a Line of Sight (LOS) propagation path. In one embodiment, the signal is a Positioning Reference Signal (PRS). In another embodiment, the signal is a data signal. In one embodiment, a propagation delay between the first base station and the second base station via the LOS propagation path is known a priori.

In one embodiment, receiving the signal comprises receiving the signal via a first arrived path of an identifiable reflected or diffracted path between the first base station and the second base station. In one embodiment, the signal is a PRS. In another embodiment, the signal is a data signal. In one embodiment, a propagation delay between the first base station and the second base station via the first arrived path is known a priori.

In one embodiment, the signal is transmitted from the first base station using transmit beamforming.

In one embodiment, receiving the signal comprises receiving the signal using receive beamforming.

In one embodiment, the method further comprises providing the delta value to a positioning estimation entity within the cellular communications system. In one embodiment, the positioning estimation entity is a location server. In another embodiment, the positioning estimation entity is a wireless communication device. In one embodiment, determining the delta value comprises determining the delta value in accordance with an original timing of the first base station.

In one embodiment, the method further comprises using the delta value at the first base station to reduce the time synchronization error between the first base station and the second base station. In one embodiment, determining the delta value comprises setting the delta value to a value that reduces a time synchronization error between the first base station and the second base station.

In one embodiment, the time reference at the first base station is a time of transmission of a transmitted signal by the first base station according to the clock of the first base station. In one embodiment, the delta value is a difference between the time of transmission of the transmitted signal by the first base station according to the clock of the first base station and the TOA of the received signal at the first base station according to the clock of the first base station.

In one embodiment, the time reference at the first base station is a start of a downlink radio frame at the first base station, a start of a downlink subframe at the first base station, a start of a downlink slot at the first base station, or a start of a downlink symbol at the first base station.

Corresponding embodiments of a first base station are also disclosed. In one embodiment, the first base station for a radio access network of a cellular communications system is adapted to receive, at the first base station, a signal transmitted by a second base station and estimate a TOA of the received signal at the first base station according to a clock of the first base station. The first base station is further adapted to determine a delta value that is or is a function of an amount of time between the TOA of the received signal at the first base station according to the clock of the first base station and a time reference at the first base station and either (a) provide the delta value to a positioning estimation entity within the cellular communications system or (b) use the delta value at the first base station to reduce a time synchronization error between the first base station and the second base station, or (c) pass the delta value to a UE.

In one embodiment, the first base station for a radio access network of a cellular communications system comprises processing circuitry configured to cause the first base station to receive, at the first base station, a signal transmitted by a second base station and estimate a TOA of the received signal at the first base station according to a clock of the first base station. The processing circuitry is further configured to cause the first base station to determine a delta value that is or is a function of an amount of time between the TOA of the received signal at the first base station according to the clock of the first base station and a time reference at the first base station and either (a) provide the delta value to a positioning estimation entity within the cellular communications system or (b) use the delta value at the first base station to reduce a time synchronization error between the first base station and the second base station, or (c) pass the delta value to a UE.

Embodiments of a method performed by a positioning estimation entity in a cellular communications system for determining an estimate of a position of a wireless communication device comprises receiving, from a plurality of base stations in a radio access network of the cellular communications system, a plurality of delay values each being a delay value for a different pair of base stations (BS i, BS j), wherein for each pair of base stations (BS i, BS j) the corresponding delay value is or is a function of an amount of time between a TOA of a signal received at BS i from BS j according to a clock of BS i and a time reference at BS i. The method further comprises obtaining TDOA measurements for different pairs of base stations (BS i, BS j) made by the wireless communication device and computing an estimate of the position of the wireless communication device based on: (a) the TDOA measurements, (b) the delay values received for the different pairs of base stations (BS i, BS j) for which the TDOA measurements were made, and (c) known propagation delays for the different pairs of base stations (BS i, BS j) for which the TDOA measurements were made.

In one embodiment, computing the estimate of the position of the wireless communication device comprises, for each of the TDOA measurements, adjusting the TDOA measurement based on the delay value received for the corresponding pair of base stations (BS i, BS j) and the known propagation delay for the corresponding pair of base stations (BS i, BS j). Computing the estimate of the position of the wireless communication device further comprises computing the estimate of the position of the wireless communication device using the adjusted TDOA measurements. In one embodiment, adjusting the TDOA measurement comprises subtracting the delay value received for the corresponding pair of base stations (BS i, BS j) and the known propagation delay for the corresponding pair of base stations (BS i, BS j) from the TDOA measurement.

In one embodiment, the known propagation delays are known LOS propagation delays for the different pairs of base stations (BS i, BS j) for which the TDOA measurements were made. In another embodiment, the known propagation delays are known first arrived path propagation delays for the different pairs of base stations (BS i, BS j) for which the TDOA measurements were made.

In one embodiment, the signal received at BS i from BS j is a PRS. In another embodiment, the signal received at BS i from BS j is a data signal.

In one embodiment, the positioning estimation entity is a location server. In another embodiment, the positioning estimation entity is the wireless communication device.

In one embodiment, the time reference at BS i is a time of transmission of a transmitted signal by BS i according to the clock of BS i. In one embodiment, the transmitted signal is a PRS. In one embodiment, the delta value is a difference between the time of transmission of the transmitted signal by BS i according to the clock of BS i and the TOA of the received signal at BS i according to the clock of BS i.

In one embodiment, the time reference at BS i is a start of a downlink radio frame at BS i, a start of a downlink subframe at BS i, a start of a downlink slot at BS i, or a start of a downlink symbol at BS i.

Corresponding embodiments of a network node for a cellular communications system are also disclosed. In one embodiment, the network node is adapted to receive, from a plurality of base stations in a radio access network of the cellular communications system, a plurality of delay values each being a delay value for a different pair of base stations (BS i, BS j), wherein for each pair of base stations (BS i, BS j) the corresponding delay value is or is a function of an amount of time between a TOA of a signal received at BS i from BS j according to a clock of BS i and a time reference at BS i. The network node is further adapted to obtain TDOA measurements for different pairs of base stations (BS i, BS j) made by the wireless communication device and compute an estimate of the position of the wireless communication device based on: (a) the TDOA measurements, (b) the delay values received for the different pairs of base stations (BS i, BS j) for which the TDOA measurements were made, and (c) known propagation delays for the different pairs of base stations (BS i, BS j) for which the TDOA measurements were made.

In one embodiment, a network node for a cellular communications system comprises processing circuitry configured to cause the network node to receive, from a plurality of base stations in a radio access network of the cellular communications system, a plurality of delay values each being a delay value for a different pair of base stations (BS i, BS j), wherein for each pair of base stations (BS i, BS j) the corresponding delay value is or is a function of an amount of time between a TOA of a signal received at BS i from BS j according to a clock of BS i and a time reference at BS i. The processing circuitry is further configured to cause the network node to obtain TDOA measurements for different pairs of base stations (BS i, BS j) made by the wireless communication device and compute an estimate of the position of the wireless communication device based on: (a) the TDOA measurements, (b) the delay values received for the different pairs of base stations (BS i, BS j) for which the TDOA measurements were made, and (c) known propagation delays for the different pairs of base stations (BS i, BS j) for which the TDOA measurements were made.

Corresponding embodiments of a wireless communication device are also disclosed. In one embodiment, the wireless communication device is adapted to receive, from a plurality of base stations in a radio access network of the cellular communications system, a plurality of delay values each being a delay value for a different pair of base stations (BS i, BS j), wherein for each pair of base stations (BS i, BS j) the corresponding delay value is or is a function of an amount of time between a TOA of a signal received at BS i from BS j according to a clock of BS i and a time reference at BS i. The wireless communication device is further adapted to obtain TDOA measurements for different pairs of base stations (BS i, BS j) made by the wireless communication device and compute an estimate of the position of the wireless communication device based on: (a) the TDOA measurements, (b) the delay values received for the different pairs of base stations (BS i, BS j) for which the TDOA measurements were made, and (c) known propagation delays for the different pairs of base stations (BS i, BS j) for which the TDOA measurements were made.

In one embodiment, a wireless communication device comprises one or more transmitters, one or more receivers, and processing circuitry associated with the one or more transmitters and the one or more receivers. The processing circuitry is configured to cause the wireless communication device to receive, from a plurality of base stations in a radio access network of the cellular communications system, a plurality of delay values each being a delay value for a different pair of base stations (BS i, BS j), wherein for each pair of base stations (BS i, BS j) the corresponding delay value is or is a function of an amount of time between a TOA of a signal received at BS i from BS j according to a clock of BS i and a time reference at BS i. The processing circuitry is further configured to cause the wireless communication device to obtain TDOA measurements for different pairs of base stations (BS i, BS j) made by the wireless communication device and compute an estimate of the position of the wireless communication device based on: (a) the TDOA measurements, (b) the delay values received for the different pairs of base stations (BS i, BS j) for which the TDOA measurements were made, and (c) known propagation delays for the different pairs of base stations (BS i, BS j) for which the TDOA measurements were made.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
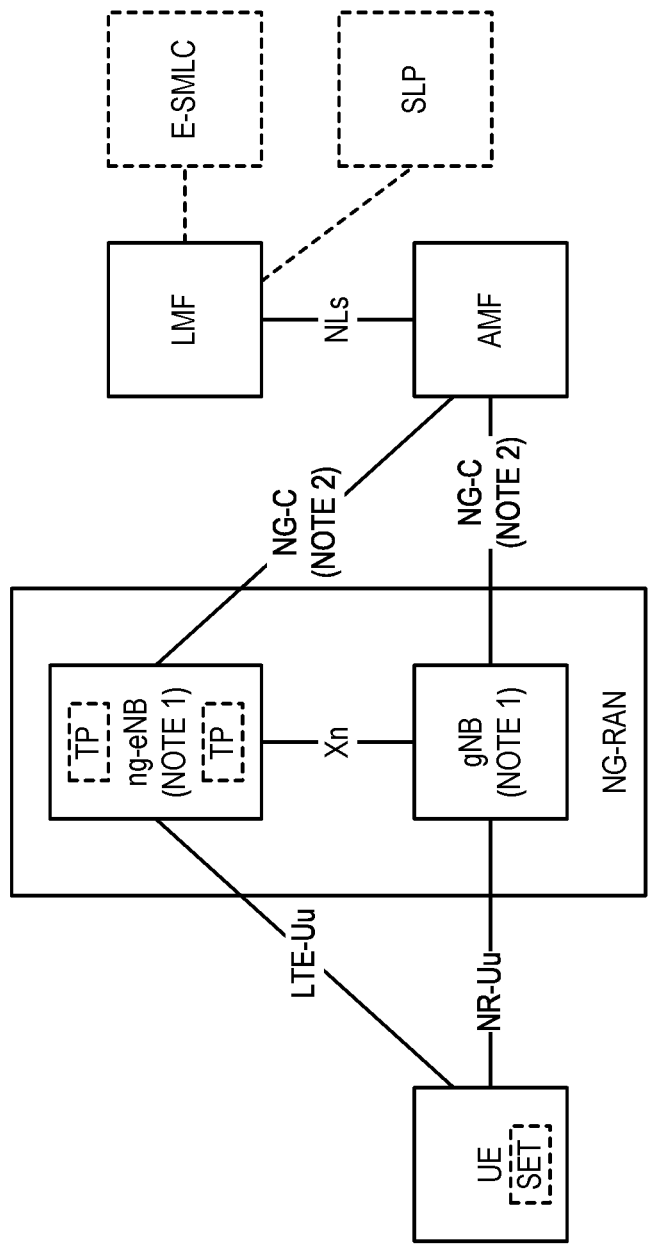
FIG. 1 is a reproduction of FIGS. 5.1-1 of Third Generation Partnership Project (3GPP) Technical Specification (TS) 38.305 V15.4.0, which shows the network architecture for positioning purposes.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Certain aspects of the present disclosure and their embodiments may provide solutions to the aforementioned or other challenges related to positioning. Systems and methods are disclosed herein for mitigating the timing error in a wireless network such as a cellular network.

In Time Difference of Arrival (TDOA) based positioning, time synchronization among base stations is the bottleneck in achieving very high positioning precision. In the present disclosure, a solution to the time synchronization problem among the base stations for positioning is provided.

By receiving a Line of Sight (LOS) Positioning Reference Signal (PRS) from a first base station (BS1) and estimating its Time of Arrival (TOA), a second base station (BS2) can, with the help of an a priori-known propagation delay between BS1 and BS2, calculate (backwards) the transmission time of the BS1 PRS (denoted here as PRS1) according to BS2's clock. Using the calculated transmission time of the PRS1 according to BS2's clock, BS2 may either: (a) adjust the timing of its own PRS and effectively eliminate the original time synchronization error between BS1 and BS2 or (b) keep the original timing of its transmitted PRS and instead estimate the time delay between the TOA of PRS1 and the transmission time of the PRS of BS2 (denoted here as PRS2), where this time delay is reported to a network node, e.g. a location server, which may then use this time delay to eliminate the time synchronization error from the Received Signal Time Difference (RSTD) measurement reported by a UE to the same network node. A combination of the approaches is also possible, i.e. reducing the time synchronization error and reporting the aforementioned time difference. A network node may alternatively inform base stations about their (BSx-BSy) mutual LOS propagation time, which the respective base stations may use to reduce or correct their synchronization time.

In various embodiments, data may be used instead of an a priori-known PRS, in which case the data is first demodulated and then re-modulated and then correlated with the received data signal. Combinations of PRS and data are also possible. In a further embodiment, the TOA is measured by BS2 not using the first arrived LOS path but instead using the first arrived path of one or more clearly identifiable reflected or diffracted paths along with a priori-known total propagation delay between BS1 and BS2. This may, e.g., be used if the LOS direction is blocked, but there is another path, via one or more reflections, which can be uniquely identified at BS2. The transmission from BS1-to-BS2 may employ beamforming in one or more directions to improve the TOA detectability at BS2 of the first path of the LOS or a known reflection. In a similar way, BS2 may also use one or more reception beams in different directions to improve the TOA detectability. Either of these: BS1 transmission (Tx) beamforming, BS2 reception (Rx) beamforming, BS1 Tx and BS2 Rx beamforming, or no Tx or Rx beamforming at both BS1 and BS2 may be used.

The above-mentioned time difference between TOA and transmission time of PRS2 by BS2 can also be seen as the gNB Rx-Tx with the received signal coming from another base station instead of from a UE.

By receiving a LOS PRS from BS1 and estimating its TOA, BS2 can, with the help of the a priori-known propagation delay between BS1 and BS2, calculate (backwards) the transmission time of the BS1 PRS according to BS2's clock. In this way BS2 gets knowledge of the timing of BS1 PRS and can adjust its own transmission accordingly and/or report the time synchronization difference to a positioning node, which can subtract this error from the received RSTD) as reported from UEs.

There are, proposed herein, various embodiments which address one or more of the issues disclosed herein. Some example embodiments are as follows. In one embodiment, a base station measures the gNB Rx-Tx based on signals received from other base stations. In some embodiments, the base station can report these measurements to a location server for position estimation purposes. In some embodiments, base stations control their transmission times with respect to signal reception time from another base station (or a UE such as, e.g., a UE in a known position) to generate a precise delay. This delay may be negative and may be set to eliminate an original time synchronization difference and result in fully time synchronized transmissions. In some embodiments, the gNB Rx-Tx delay generation and measurement can also be done in Integrated Access and Backhaul (IAB) setup where the UE in an IAB node listens to signals from another base station(s). In other words, an IAB node could have the same processing as BS2 described herein. In some embodiments, the base station reports the signals over which these measurements are made to the location server for a positioning use case. In one embodiment, the base station measures delays $\Delta_{ij}$ while receiving and transmitting PRS. In one embodiment, a location server collects $\Delta_{ij}$ values for multiple base stations involved in PRS transmission and uses these values along with reported measurements from a UE to compute an estimate of the UE's position. In one embodiment, a base station implements a device which can measure very precise delays for positioning purposes. In one embodiment, a location server requests base stations to send $\Delta_{ij}$ values. In one embodiment, the location server transmits desired $\Delta_{ij}$ values to base stations with instructions to apply these. These values may be adjusted, based on a priori knowledge about propagation delays, to match these propagation delays, so as to achieve quasi-ideal time synchronization between base stations. In one embodiment, BS1 may use several different Tx beam directions for the transmission of a PRS from BS1. Some of these beam directions may be better suited to allow BS2 to receive the PRS via some reflection (when the LOS path is blocked or where the reflected path allows for a more clearly identifiable first impulse). In one embodiment, BS2 may use several different Rx beam directions for the reception of a PRS from BS1. Some of these beam directions may be better suited to allow BS2 to receive the PRS from BS1 via some reflection (when the LOS path is blocked or where the reflected path allows for a more clearly identifiable first impulse). In one embodiment, data is used (alone or in combination with PRS) for the TOA estimation. When data is used, the received data signal from BS1 is first demodulated, then re-modulated so that a copy of the BS1-transmitted signal is derived. This re-created signal is then time correlated against the actually received signal, which results in a cross-correlation, which is the channel impulse response. This may then be used to estimate the TOA of the first path, exactly as when a PRS is used for correlation. The advantage with data is there is much more data than PRS in a received signal. In one embodiment, the base station distributes the relative TOA information (i.e., the delta values) to target devices (e.g., UEs), where the information can be determined in the base station, provided by other base stations, or provided by the location server. The distribution to the target device can be via radio network broadcast or dedicated signaling. In one embodiment, the base station or the location server distributes the relative TOA information (i.e., the delta values) to a UE for UE based positioning. In another embodiment, the base station provides the relative TOA information to another network node such as a base station.

Certain embodiments may provide one or more of the following technical advantage(s). For example, embodiments of the present disclosure may provide any one or more of the following advantages:

Embodiments of the present disclosure alleviate the need of very precise time synchronization for positioning by accounting for delay errors between transmissions of base stations.

Embodiments of the present disclosure can be implemented with existing signals and/or data.

Embodiments of the present disclosure improve time synchronization among the base stations.

Embodiments of the present disclosure can be implemented in the products without much additional complexity.

Embodiments of the present disclosure are not dependent on any UE feature. Hence, this makes it easier for the network to implement the proposed method.

Embodiments of the present disclosure are very simple and effective.

Figure 2A:
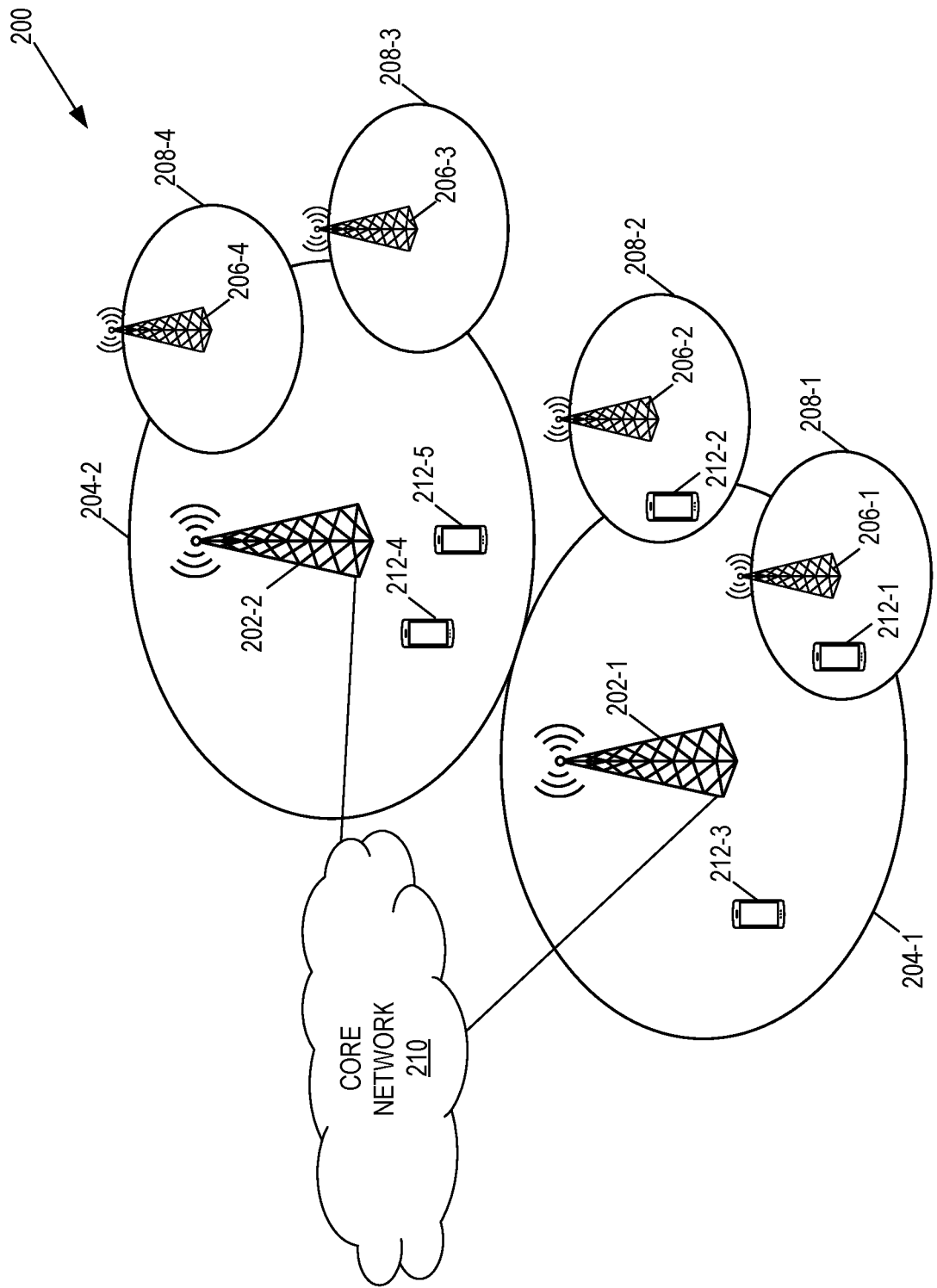
FIGS. 2A and 2B illustrates an example of a cellular communications system in which embodiments of the present disclosure may be implemented.

FIG. 2A illustrates one example of a cellular communications system 200 in which embodiments of the present disclosure may be implemented. In the embodiments described herein, the cellular communications system 200 is a 5G System (5GS) including a Next Generation RAN (NG-RAN) (also referred to herein as a NR RAN). In this example, the RAN includes base stations 202-1 and 202-2, which in the 5GS are referred to as gNBs or next generation eNBs (ng-eNBs) (e.g., LTE RAN nodes connected to a 5G Core (5GC)), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs and as such referred to as UEs 212, but the present disclosure is not limited thereto.

Figure 2B:
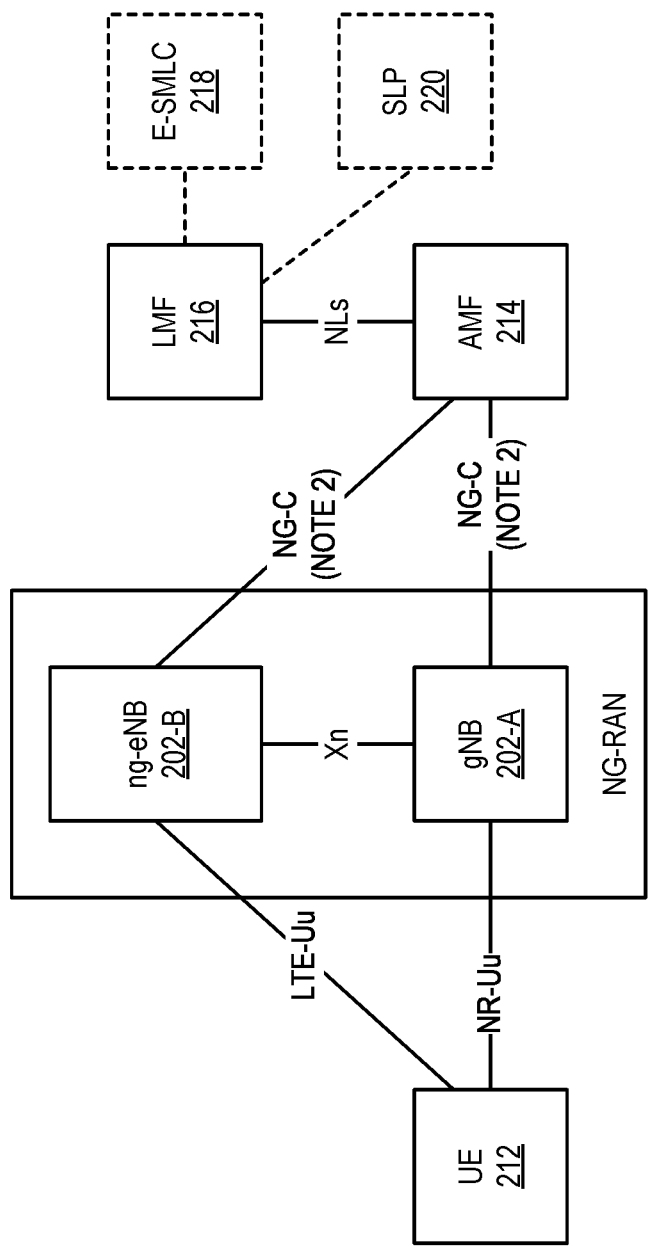

In the preferred embodiments described herein, for positioning purposes, the cellular communications system 200 has the network architecture described above with respect to FIG. 1. This is illustrated in FIG. 2B. More specifically, as illustrated in FIG. 2B, for location purposes, the core network 110 includes an AMG 214, a Location and Management Function (LMF) 216, optionally an Evolved Serving Mobile Location Center (E-SMLC) 218, and optionally an Secure User Plane Location (SUPL) Location Platform (SLP) 220. Note that, with respect to the network functions (NFs) within the 5GC (e.g., AMF 214, LMF 216, etc.), these NFs may be implemented as, e.g., a network element on a dedicated hardware, as a software instance running on a dedicated hardware, or as a virtualized function instantiated on an appropriate platform, e.g., a cloud infrastructure.

Figure 3:
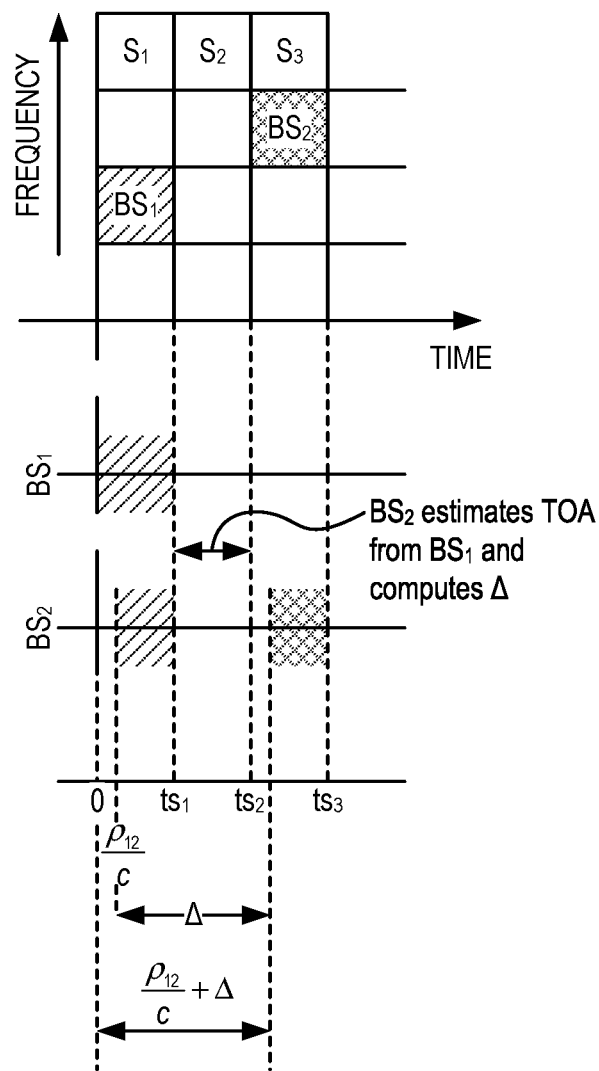
FIG. 3 illustrates controlling timing of transmission from a base station based on relative time measurement using a local base station clock in accordance with some embodiments of the present disclosure.

FIG. 3 illustrates controlling timing of transmission from a base station (e.g., base station 202) based on relative time measurement using a local base station clock in accordance with some embodiments of the present disclosure. As can be seen in FIG. 3, example time frequency resources of a hypothetical Positioning Reference Signal (PRS) are shown on the top of FIG. 3. S1, S2, and S3 are different symbols in the considered slot. Two base stations, denoted as BS1 and BS2, are shown transmitting during two different symbol locations S1 and S3. The time domain waveform at the two base stations is shown in the lower part of FIG. 3. Towards the bottom of FIG. 3, a time scale is shown depicting various time events at the two base stations.

As shown in FIG. 3, BS1 transmits a PRS at time 0. BS2 receives this PRS after a delay $\rho_{12}/c$, where $\rho_{12}$ is the propagation distance between the two base stations BS1 and BS2 and c is the speed of light. Since the propagation path between BS1 and BS2 is either the first arrived Line of Sight (LOS) path or the first arrived path of a clearly identifiable reflected or diffracted path, the delay $\rho_{12}/c$ is also referred to herein as the LOS propagation time from BS1 to BS2, which is assumed to be known by BS2 and/or a network node. After receiving the PRS from BS1, BS2 estimates the TOA ($TOA_{BS2}^{BS1}$) of the PRS transmitted by BS1 at BS2 according to the clock of BS2, as shown in the FIG. 3. $TOA_{BS2}^{BS1}$ can be estimated in a subsequent symbol, as shown as an example in FIG. 3. However, it is an implementation issue, and there can be many different ways of implementing the TOA estimation. While estimating TOA, latency aspects can be kept in mind.

The LOS propagation time from BS1 to BS2 (i.e., the delay $\rho_{12}/c$) is assumed to be known by BS2 and/or a network node. The transmission time of the PRS from BS1 according to BS2's clock can therefore be inferred to have taken place at $TOA_{BS2}^{BS1}$ minus this BS1-to-BS2 LOS propagation time (i.e., at $TOA_{BS2}^{BS1} - \rho_{12}/c$)). With this information about the PRS transmission time from BS1 according to the clock of BS2, BS2 may have full control, and/or knowledge of, its own transmission time. Based on this, the BS2 may choose its own time synchronization relative to BS1. The time difference between the transmission time of a PRS at BS2 and $TOA_{BS2}^{BS1}$ is denoted herein as delta ($\Delta$), i.e. $\Delta$=TX_time at BS2 minus $TOA_{BS2}^{BS1}$. Delta ($\Delta$) may be set to any desired value within the time synchronization requirements for communication, including negative values, when applied to later occurrences of the PRS. As a special case, delta ($\Delta$) may be set to a negative value cancelling the original time synchronization difference between BS1 and BS2, i.e. $\Delta$=T_BS1_transmission minus $TOA_{BS2}^{BS1}$. Alternatively, BS2 may keep its original timing and just report the consequent delta ($\Delta$) to a network node, or choose a desired time synchronization, different from the original one, but not cancelling—but reducing—the BS1-BS2 time synchronization difference.

As shown in FIG. 3, the BS2 computes a delay A, which is the time delay from the $TOA_{BS2}^{BS1}$ at BS2 of the PRS from BS1 at which BS2 transmits a PRS. The delay A takes a value to ensure the transmission from BS2 to be well within the time synchronization tolerance around the symbol boundary, which is roughly 3 microseconds (s) in some instances. The delay A can be known a priori and generated at the BS2 to introduce the delay before BS2 transmitting. Or, the delay A can be decided by the BS2 based on some optimizing criteria and, if required, can be shared in the network.

So, the BS2 while meeting the timing boundaries of symbols available from the network generates the delay A which adheres to the network timing requirements.

The two-fold advantages of this approach are:
1. The time synchronization accuracy among base stations increases. The delay A would typically be a smaller delay of the order of a few µs as in the example of FIG. 3. A clock with a reasonable frequency drift specification, say 10 parts per million (PPM), would introduce an error of 1 nanoseconds (ns) in a duration of 10 µs or an error of 30 centimeters (cm) in distance. A tighter specification, say 1 PPM, would introduce an error of 0.1 ns or a distance error of 3 cm. So, this error is much smaller on average compared to the uniformly distributed error within 3 µs around a symbol time, which is error distance equivalent of 900 meters.
2. Base stations are controlling their transmission time with respect of transmissions of other base stations after having introduced a known delay. This can be useful for some other features in network optimization.

The constraint on transmission timing by a base station while adhering to the network timing, as discussed above, can be written as, $$TOA_{BS2}^{BS1} + \Delta \in \{TS_2 \pm 1.5\ \mu s\}$$

where, $TS_2$ is the symbol timing for symbol 2 in FIG. 3.

While above generating the delay A by BS2 before transmitting has been discussed, in some other embodiments, BS2 only measures the delay between the $TOA_{BS2}^{BS1}$ of the PRS from BS1 at BS2 and the time of transmission of the PRS by BS2. This measurement is equally useful.

While the above example is shown at the symbol level, the generation and measurement of the delay can also be done at the slot level, subframe level, or frame level.

Figure 4:
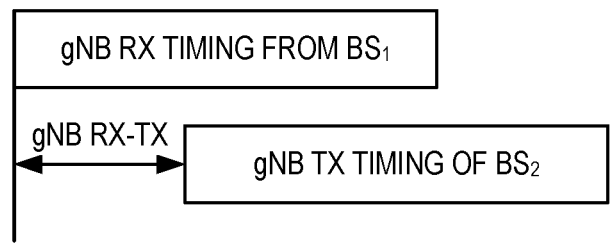
FIG. 4 illustrates New Radio (NR) base station (gNB) reception (Rx) and transmission (Tx) in the context of receptions and transmissions.

FIG. 4 illustrates gNB reception (Rx) and transmission (Tx) in the context of receptions and transmissions. The delay A is also the gNB Rx-Tx delay measurement specified in 3GPP, as shown in FIG. 4, if the Rx time measurement is based on reception from a base station. It should again be noted that the delay A may be negative, e.g. equal to (but with opposite sign) to the LOS propagation delay, in which case the end result is full time synchronization. Of course, a single PRS2 transmission cannot be earlier than the TOA of the PRS1, but considering a sequence of PRS2s, the timing of these may be adjusted arbitrarily (positively or negatively).

Figure 5:
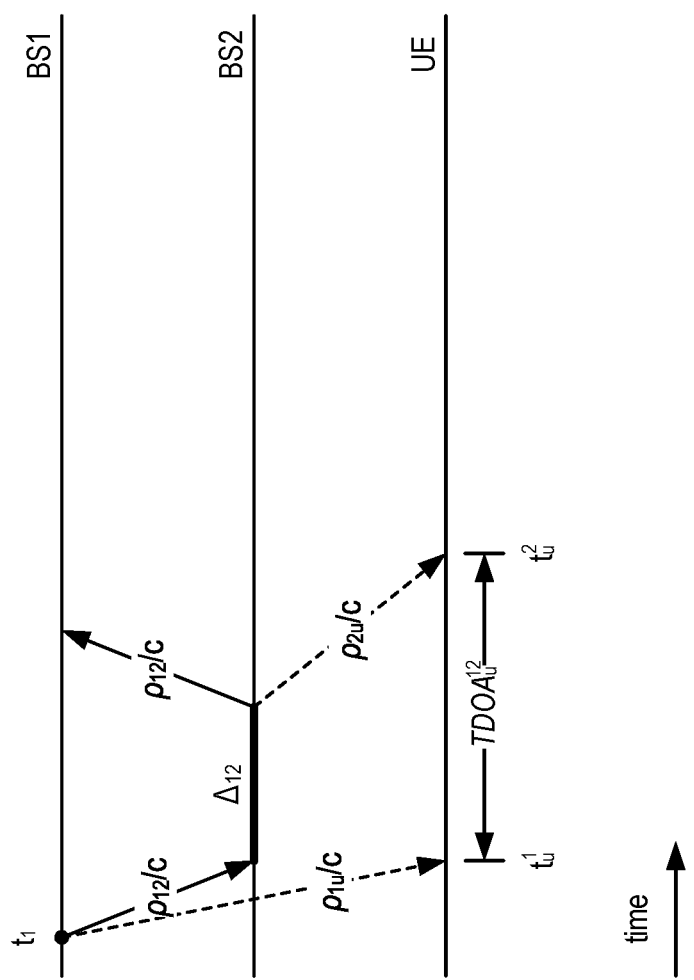
FIG. 5 illustrates measurement at a wireless communication device based on Positioning Reference Signals (PRSs) received from base stations in accordance with an embodiment of the present disclosure.

For positioning, the measurement at the UE (e.g., UE 212) based on PRSs received from BS1 and BS2 is shown in FIG. 5. As can be derived from FIG. 5, the Time Difference of Arrival (TDOA) measurement at the UE can be written as:

$$TDOA_u^{12} = t_u^2 - t_u^1$$

where $TDOA_u^{12}$ is the TDOA measurement between BS1 and BS2 measured at the UE, $t_u^1$ is the Time of Arrival (TOA) of the PRS transmitted by BS2 at the UE, and $t_u^1$ is the TOA of the PRS transmitted by BS1 at the UE. Looking at FIG. 5, $t_u^2$ can be rewritten as:

$$t_u^2 = t_1 + \frac{\rho_{12}}{c} + \Delta_{12} + \frac{\rho_{2u}}{c}$$

where $t_1$ is the time of transmission of the PRS at BS1 and $\rho_{2u}$ is the unknown distance between BS2 and the UE. Also, looking at FIG. 5, $t_u^1$ can be rewritten as:

$$t_u^1 = t_1 + \frac{\rho_{1u}}{c}$$

where $\rho_{1u}$ is the unknown distance between BS2 and the UE. Thus, $TDOA_u^{12}$ can be written as:

$$TDOA_u^{12} = t_u^2 - t_u^1 = \frac{\rho_{12}}{c} + \Delta_{12} + \frac{\rho_{2u}}{c} - \frac{\rho_{1u}}{c}.$$

By multiplying by c, the $TDOA_u^{12}$ measurement can be expressed as a distance measurement ($y_u^{12}$), which can be written as:

$$y_u^{12} = \rho_{12} + c \cdot \Delta_{12} + \rho_{2u} - \rho_{1u}.$$

This can be the Received Signal Time Difference (RSTD), measured by the UE.

More generally, above expression can be written as:

$$y_u^{ij} = \rho_{ij} + c \cdot \Delta_{ij} + \rho_{ju} - \rho_{iu}.$$

The $\rho_{ju} - \rho_{iu}$ is what the UE measures, which includes the time synchronization error. By subtracting the known $\rho_{ij} + c \cdot \Delta_{ij}$ (with $\rho_{ij}$ being a priori-known and $\Delta_{ij}$ being derived from TOA measurement ($TOA_{BS2}^{BS1}$) at BS2 plus internal known delay), the time synchronization error between BS1 and BS2 may be eliminated from the UE-reported RSTD values. These corrected values are then used for positioning using, e.g., well-known triangulation methods.

It should be noted that the value of delta may either be a consequence of an already existing time synchronization, which is then unmodified by the present disclosure, in which case $\Delta$ is reported to a network node, which uses this information to compensate for this (remaining) time synchronization error. Alternatively, $\Delta$ may be set to any desired value, to reduce or eliminate the original time synchronization error, in which case the $\Delta$ is used within BS2 to control when PRS is transmitted by BS2 and is not reported to a network node because the time synchronization error is compensated for within BS2 and as such is not needed to again be compensated for by the network node.

In a network, the above measurements can be collected among pairs of base stations. Traditional TDOA based positioning methods would work for these measurements. The term $\Delta_{ij}$ would appear as constants in these measurements and the values would be known from base station reporting. In the above example, base station j would report the measured $\Delta_{ij}$ if the LOS path is always used for the TOA estimation at BS2. The propagation delay can then be known a priori by the network node performing the positioning. However, when e.g. a reflected path is always used, then its total propagation delay may be known a priori by the network node. In cases where the actual path used for TOA varies with time, e.g. due to varying channel conditions, the BS2 may report which path, among a pre-determined set of potential paths, is used. The network node may then have corresponding propagation delays stored as a priori information One advantage of reporting $\Delta_{ij}$ values is avoiding the necessity of very precise time synchronization among base stations in the network.

Figure 6:
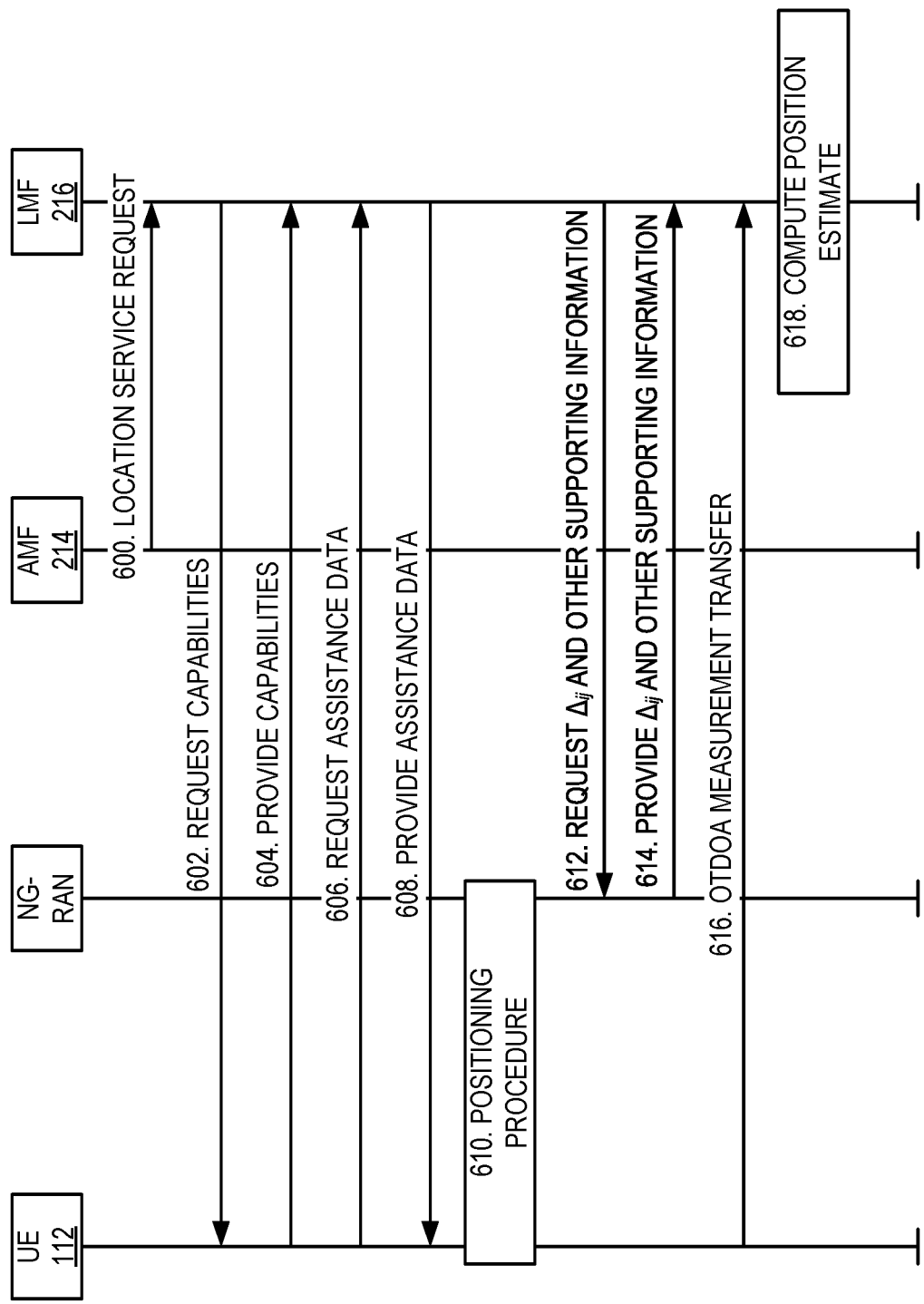
FIG. 6 illustrates an example signaling exchange for positioning among various nodes when the Location Management Function (LMF) is the entity that performs positioning estimation in accordance with one embodiment of the present disclosure.

FIG. 6 illustrates an example signaling exchange for positioning among various nodes when the LMF 216 is the entity that performs positioning estimation in accordance with one embodiment of the present disclosure. The steps of the procedure illustrated in FIG. 6 are as follows:

Step 600: The AMF 214 sends a location service request to the LMF 216.

Step 602: The LMF 216 sends, to a UE 212, a request for the UE capabilities of the UE 212.

Step 604: The UE 212 provides its UE capabilities to the LMF 216.

Step 606: The UE 212 sends, to the LMF 216, a request for assistance data. The assistance data could be, e.g., information about structure and time/frequency location of the Positioning Reference Signal (PRS) that the UE uses to estimate TOAs and RSTDs.

Step 608: The LMF 216 responds with the requested assistance data.

Step 610: The UE 212 and NG-RAN (e.g., multiple base stations (BSs) 102) perform a positioning procedure whereby the UE 212 obtains measurements as described above. In this example, during this positioning procedure, the UE 212 obtains measurements for different pairs of base stations ($BS_i$ and $BS_j$), where each $BS_i$ determines or otherwise obtains the $\Delta_{ij}$ value for that pair of base stations, as described above.

Step 612: The LMF 216 requests the $\Delta_{ij}$ values and other supporting information (e.g., the geographic locations of the base stations 102) from the base stations 102 in the NG-RAN.

Step 614: The base stations 102 provide the requested $\Delta_{ij}$ values and other supporting information to the LMF 216.

Step 616: The UE 212 sends the measurements, which in this example are Observed TDOA (OTDOA) measurements, to the LMF 216.

Step 618: The LMF 216 computes an estimate of the position of the UE 212 based on the reported OTDOA measurements.

Figure 7:
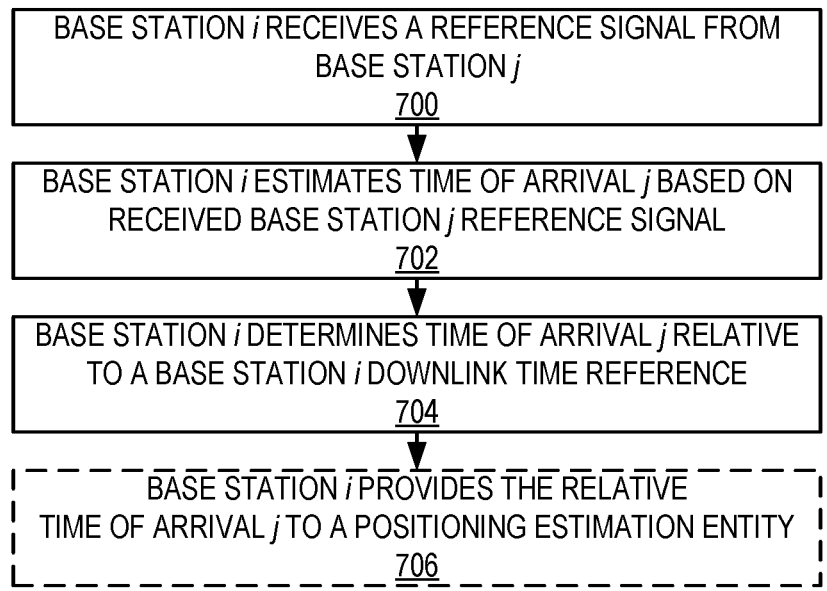
FIG. 7 is a flow chart that illustrates the operation of a first base station ($BS_i$) (e.g., during the positioning procedure of step 610 of FIG. 6) with respect one base station pair ($BS_i$, $BS_j$), in accordance with one example embodiment of the present disclosure.

FIG. 7 is a flow chart that illustrates the operation of $BS_i$ (e.g., during the positioning procedure of step 610 of FIG. 6) with respect one BS pair ($BS_i$, $BS_j$), in accordance with one example embodiment of the present disclosure. Optional steps are represented by dashed lines/boxes. Note that $BS_i$ may also be referred to herein as base station, or BS, 202-$i$. From the base station perspective, the BS i receives a reference signal from BS j (step 700), and estimates the TOA (step 702). Note that $BS_j$ may also be referred to herein as base station, or BS, 202-$j$. As discussed above, in one embodiment, the reference signal is received via a LOS propagation path. In one embodiment, the reference signal is received via a first arrived path of an identifiable reflected or diffracted path between $BS_j$ and $BS_i$. In one embodiment, the reference signal is a PRS. In another embodiment, the received signal is a data signal. In one embodiment, a propagation delay between $BS_j$ and $BS_j$ (e.g., via the LOS propagation path) is known a priori. In some embodiments, the signal is transmitted by $BS_j$ by transmit beamforming. In some embodiments, $BS_j$ receives the signal using receive beamforming.

The estimated TOA is related to a BS i time reference to determine the relative TOA $\Delta_{ij}$ (step 704). In one embodiment, the BS i time reference is an original timing of $BS_j$. In one embodiment, the BS i time reference is a time of transmission of a transmitted signal by $BS_j$ according to the clock of $BS_j$. The BS i time reference can be the downlink transmission timing of a downlink PRS, the start of a downlink radio frame, subframe, or slot, etc. It can be the most recent previous or upcoming transmission, or some other transmission. Note that, in the description above, the relative TOA $\Delta_{ij}$ is also referred to as "delta" or "delay" between the estimated TOA at BS i and the time of transmission of the reference signal at BS i. As discussed above, in one embodiment, determining the relative TOA $\Delta_{ij}$ comprises setting the relative TOA $\Delta_{ij}$ to a value that reduces a time synchronization error between $BS_j$ and $BS_j$. In one embodiment, the relative TOA $\Delta_{ij}$ is a difference between the time of transmission of the transmitted signal by $BS_i$ according to the clock of $BS_i$ and the TOA of the received signal at $BS_i$ according to the clock of $BS_i$.

In some embodiments (e.g., the embodiment of FIG. 6), the BS i provides the relative TOA $\Delta_{ij}$ to a positioning entity (step 706). The positioning entity can be the location server, the target device, a network node, another base station, or some separate network node outside the operator network. In one mode of the embodiment, the provisioning to the target device is via radio network broadcast. In another mode, the distribution is via dedicated signaling.

However, in other embodiments, the BS i sets the delta value $\Delta_{ij}$ to correct the time synchronization (or at least reduce the time synchronization error) between BS i and BS j and may not provide the delta value $\Delta_{ij}$ to the positioning estimation entity. For example, BS i sets the delta value $\Delta_{ij}$ to control the time of transmission of the PRS by the BS i such that the transmission of the PRS by the BS i and the transmission of the PRS by BS j are fully synchronized. For example, the delta value $\Delta_{ij}$ may be set to a value that is equal to the time of transmission of the received PRS from BS j (as determined by the TOA of the PRS from BS j at BS i and the known propagation delay between BS j and BS i) plus an amount of time equal to N slots (e.g., N=2 in the example of FIG. 3) such that the two PRS transmissions are fully synchronized.

Figure 8:
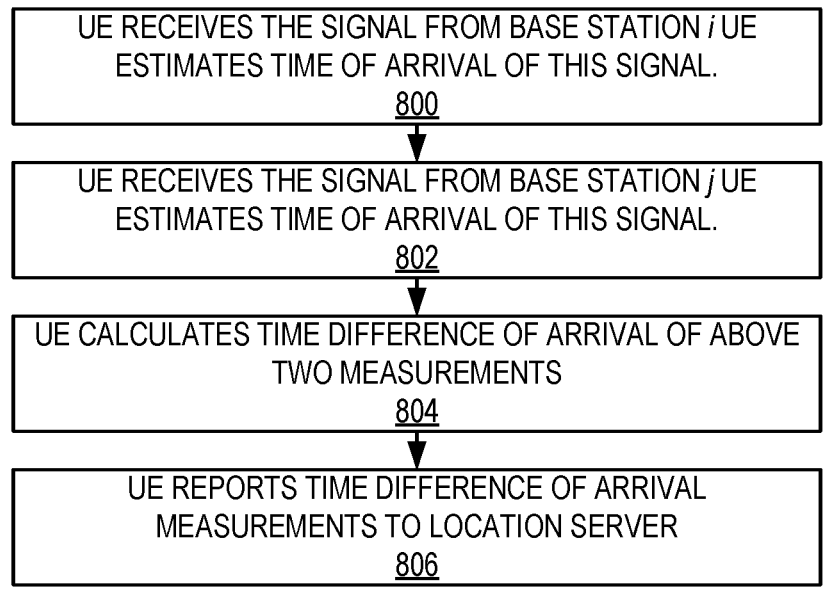
FIG. 8 is a flow chart that illustrates the operation of a wireless communication device in accordance with some embodiments of the present disclosure.

FIG. 8 is a flow chart that illustrates the operation of a UE (e.g., UE 212) in accordance with some embodiments of the present disclosure. As illustrated, the UE receives a signal (e.g., PRS) from BS i and estimates the TOA of this signal at the UE (step 800). The UE also receives a signal (e.g., PRS) from BS j and estimates the TOA of this signal at the UE (step 802). The UE calculates a TDOA between the TOA of the two signals from steps 800 and 802 (step 804). The UE may alternatively use the TOAs of the two signals to compute another related measurement such as an RSTD measurement, as described above. The UE reports the TOA measurement to the location server (e.g., LMF) (step 806).

Figure 9:
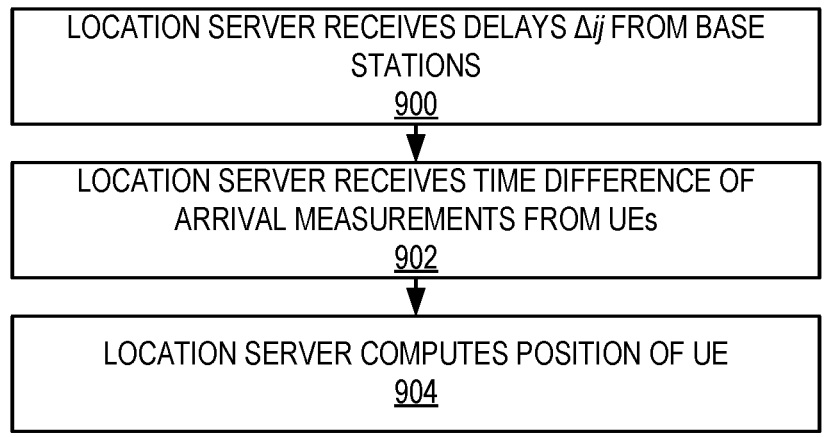
FIG. 9 is a flow chart that illustrates the operation of the location server (e.g., LMF) in accordance with some embodiments of the present disclosure.

FIG. 9 is a flow chart that illustrates the operation of the location server (e.g., LMF) in accordance with some embodiments of the present disclosure. Note that while this process is described for the location server, this process is more generally applicable to any position estimation entity (e.g., LMF 212 or, in a UE based scheme, the UE 212). As illustrated, the location server receives the $\Delta_{ij}$ values from the base stations (step 900). As discussed above, each $\Delta_{ij}$ value is a delay value for a different pair of base stations (BS i, BS j), wherein for each pair of base stations (BS i, BS j) the corresponding delay value is or is a function of an amount of time between a TOA of a signal received at BS i from BS j according to a clock of BS i and a time reference at BS i. In one embodiment, the signal received at BS i from BS j is a PRS. In another embodiment, the signal received at BS i from BS j is a data signal. In one embodiment, the time reference at BS i is a time of transmission of a transmitted signal by BS i according to the clock of BS i. In another embodiment, The location server also receives TDOA measurements from the UEs (step 902). The location server computes an estimate of the position of the UE based on the received TDOA measurements and the received $\Delta_{ij}$ values (step 904). As discussed above, the estimate of the position of the UE is further based on known propagation delays for the different pairs of base stations (BS i, BS j) for which the TDOA measurements were made. As discussed above, in one embodiment, the known propagation delays are known LOS propagation delays for the different pairs of base stations (BS i, BS j) for which the TDOA measurements were made. In another embodiment, the known propagation delays are known first arrived path propagation delays for the different pairs of base stations (BS i, BS j) for which the TDOA measurements were made.

Figure 16:
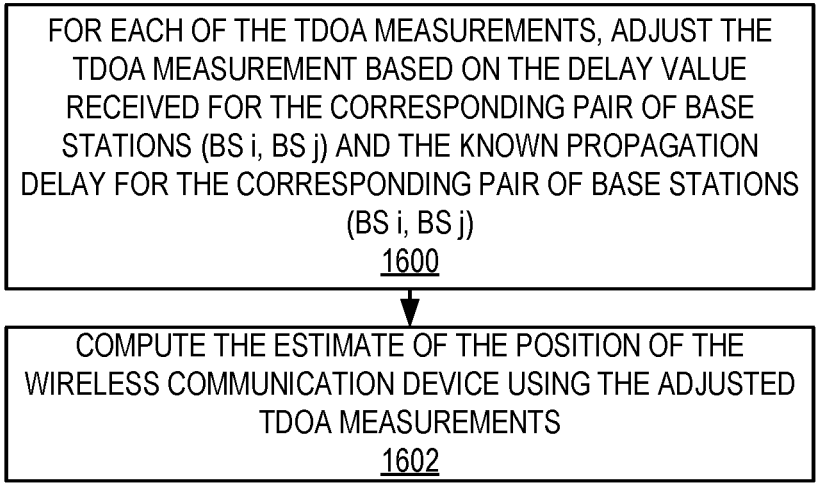
FIG. 16 is a flow chart that illustrates the details of step 904 of FIG. 9 in more detail in accordance with an embodiment of the present disclosure.

In one embodiment, as illustrated in FIG. 16, computing the estimate of the position of the UE in step 904 includes, for each of the TDOA measurements, adjusting the TDOA measurement based on the delay value received for the corresponding pair of base stations (BS i, BS j) and the known propagation delay for the corresponding pair of base stations (BS i, BS j) (step 1600) and computing the estimate of the position of the UE using the adjusted TDOA measurements (step 1602). In one embodiment, adjusting the TDOA measurement in step 1600 comprises subtracting the delay value received for the corresponding pair of base stations (BS i, BS j) and the known propagation delay for the corresponding pair of base stations (BS i, BS j) from the TDOA measurement.

Figure 10:
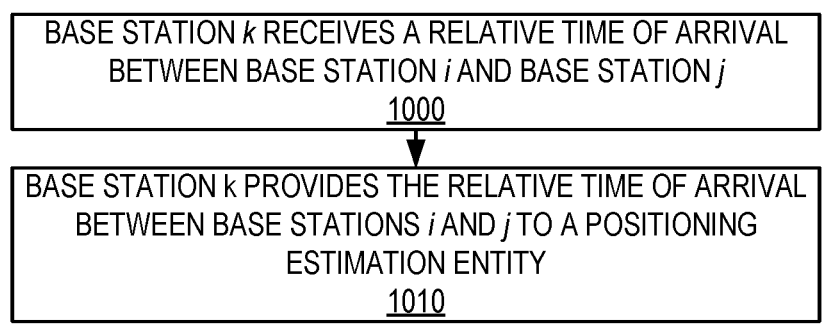
FIG. 10 illustrates the operation of a base station (i.e., BS k) when the BS k operates to distribute information about inter-base station relative timing differences in accordance with some embodiments of the present disclosure.

FIG. 10 illustrates the operation of a base station (i.e., BS k) when the BS k operates to distribute information about inter-base station relative timing differences in accordance with some embodiments of the present disclosure. As illustrated, the BS k may obtain relative base station TOAs between two base stations i and j (step 1000). For example, it may obtain the information from BS i or BS j, from a location server, or from some other network node. The BS k may provide the relative TOA information to a positioning estimation entity (step 1002). In one example embodiment, the positioning entity is the target device. In one mode of the embodiment, the provisioning is via radio network broadcast. In another mode, the distribution is via dedicated signaling.

Figure 11:
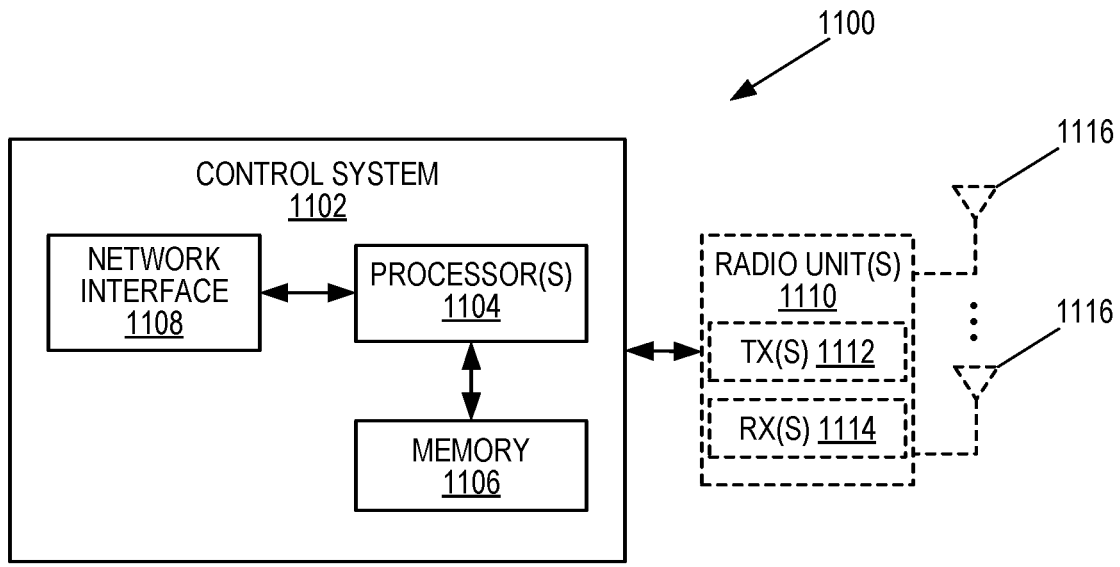
FIGS. 11, 12, and 13 are schematic block diagrams of example embodiments of a network node.

FIG. 11 is a schematic block diagram of a network node 1100 (e.g., a base station 202, a network nodes that implements some or all of the functionality of a base station described herein, or a network node on which a LMF or location server is implemented) according to some embodiments of the present disclosure. Optional features are represented by dashed boxes. As illustrated, the network node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, if the network node 1100 is a radio access node, the network node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a network node 1100 as described herein (e.g., one or more functions of a base station, LMF, or location server described herein). In some embodiments, the function(s) are implemented in software that is stored, e.g., in the memory 1106 and executed by the one or more processors 1104.

Figure 12:
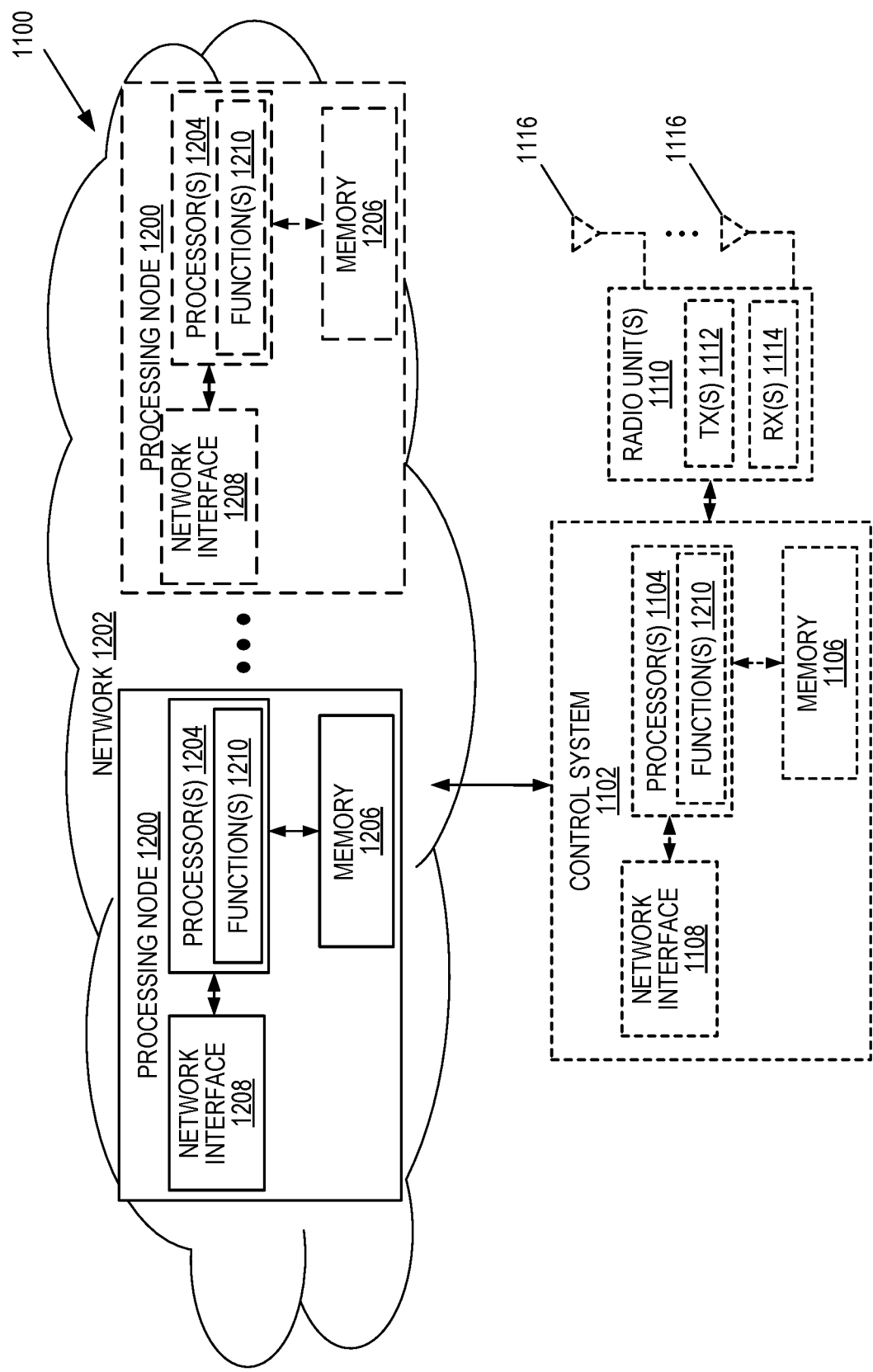

FIG. 12 is a schematic block diagram that illustrates a virtualized embodiment of the network node 1100 according to some embodiments of the present disclosure. This discussion is equally applicable to other types of network nodes. As used herein, a "virtualized" network node is an implementation of network access node 1100 is implemented as a virtual component(s) (e.g., via a virtual machine (s) executing on a physical processing node(s) in a network (s)). As illustrated, in this example, the network node 1100 may include the control system 1102 and/or the one or more radio units 1110, as described above. The network node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the network node 1100 described herein (e.g., one or more functions of a base station, LMF, or location server described herein) are implemented at the one or more processing nodes 1200 or distributed across the one or more processing nodes 1200 and the control system 1102 and/or the radio unit(s) 1110 in any desired manner. In some particular embodiments, some or all of the functions 1210 of the network node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of network node 1100 or a node (e.g., a processing node 1200) implementing one or more of the functions 1210 of the network node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
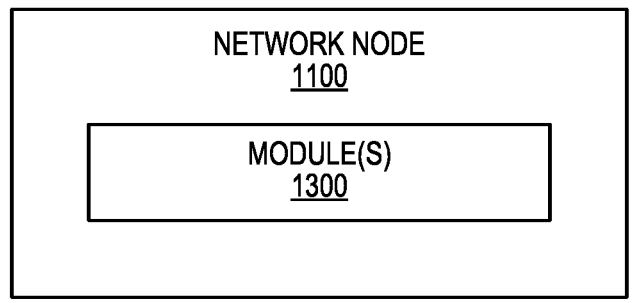

FIG. 13 is a schematic block diagram of the network node 1100 according to some other embodiments of the present disclosure. The network node 1100 includes one or more modules 1300, each of which is implemented in software. The module(s) 1300 provide the functionality of the network node 1100 described herein (e.g., one or more functions of a base station, LMF, or location server described herein). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
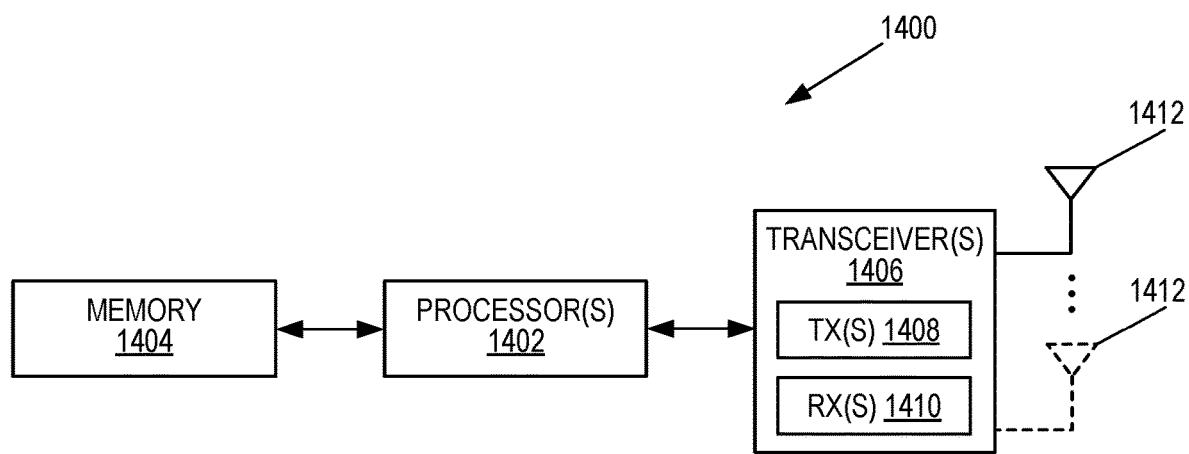
FIGS. 14 and 15 are schematic block diagrams of example embodiments of a wireless device.

FIG. 14 is a schematic block diagram of a wireless communication device 1400 (e.g., a UE) according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above (e.g., one or more functions of a UE described herein) may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein (e.g., one or more functions of a UE described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
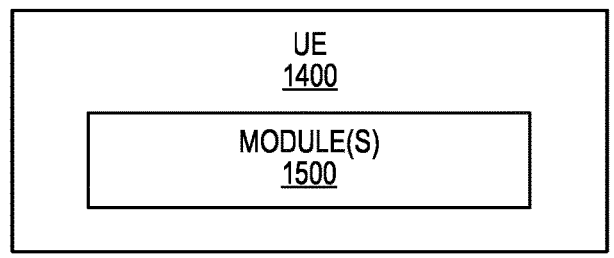

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein (e.g., one or more functions of a UE described herein).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

The following include several exemplary embodiments as enumerated clauses. The features of the enumerated clauses may be combined in other embodiments which are included within the scope of the present disclosure.

Embodiment 1: A method performed by a first base station in a radio access network of a cellular communications system, the method comprising: receiving (700), at the first base station, a signal transmitted by a second base station; estimating (702) a Time of Arrival, TOA, of the received signal at the first base station according to a clock of the first base station; determining (704) a delta value that is or is a function of an amount of time between the TOA of the received signal at the first base station according to the clock of the first base station and a time reference at the first base station; and either (a) providing (706) the delta value to a positioning estimation entity within the cellular communications system or (b) using the delta value at the first base station to reduce a time synchronization error between the first base station and the second base station or (c) the value of delta can be passed over to the UE, for UE based positioning.

Embodiment 2: The method of embodiment 1 wherein receiving (700) the signal comprises receiving (700) the signal via a Line of Sight, LOS, propagation path.

Embodiment 3: The method of embodiment 2 wherein the signal is a Positioning Reference Signal, PRS.

Embodiment 4: The method of embodiment 2 wherein the signal is a data signal.

Embodiment 5: The method of any of embodiments 2 to 4 wherein a propagation delay between the first base station and the second base station via the LOS propagation path is known a priori.

Embodiment 6: The method of embodiment 1 wherein receiving (700) the signal comprises receiving (700) the signal via a first arrived path of an identifiable reflected or diffracted path between the first base station and the second base station.

Embodiment 7: The method of embodiment 6 wherein the signal is a Positioning Reference Signal, PRS.

Embodiment 8: The method of embodiment 6 wherein the signal is a data signal.

Embodiment 9: The method of any of embodiments 6 to 8 wherein a propagation delay between the first base station and the second base station via the first arrived path is known a priori.

Embodiment 10: The method of any of embodiments 1 to 9 wherein the signal is transmitted from the first base station using transmit beamforming.

Embodiment 11: The method of any of embodiments 1 to 10 wherein receiving (700) the signal comprises receiving (700) the signal using receive beamforming.

Embodiment 12: The method of any of embodiments 1 to 11 comprising providing (706) the delta value to a positioning estimation entity within the cellular communications system.

Embodiment 13: The method of embodiment 12 wherein the positioning estimation entity is a location server.

Embodiment 14: The method of embodiment 12 wherein the positioning estimation entity is a wireless communication device (212).

Embodiment 15: The method of any of embodiments 12 to 14 wherein determining (704) the delta value comprises determining (704) the delta value in accordance with an original timing of the first base station.

Embodiment 16: The method of any of embodiments 1 to 11 comprising using the delta value at the first base station to reduce the time synchronization error between the first base station and the second base station.

Embodiment 17: The method of embodiment 16 wherein determining (704) the delta value comprises setting (704) the delta value to a value that reduces a time synchronization error between the first base station and the second base station.

Embodiment 18: The method of any of embodiments 1 to 17 wherein the time reference at the first base station is a time of transmission of a transmitted signal by the first base station according to the clock of the first base station.

Embodiment 19: The method of embodiment 18 wherein the delta value is a difference between the time of transmission of the transmitted signal by the first base station according to the clock of the first base station and the TOA of the received signal at the first base station according to the clock of the first base station.

Embodiment 20: The method of any of embodiments 18 to 19 further comprising transmitting the transmitted signal.

Embodiment 21: The method of any of embodiments 18 to 20 wherein the transmitted signal is a Positioning Reference Signal, PRS.

Embodiment 22: The method of any of embodiments 1 to 17 wherein the time reference at the first base station is a start of a downlink radio frame at the first base station, a start of a downlink subframe at the first base station, a start of a downlink slot at the first base station, or a start of a downlink symbol at the first base station.

Embodiment 23: A method performed by a positioning estimation entity in a cellular communications system for determining an estimate of a position of a wireless communication device (212), the method comprising: receiving (900), from a plurality of base stations in a radio access network of the cellular communications system, a plurality of delay values each being a delay value for a different pair of base stations (BS i, BS j), wherein for each pair of base stations (BS i, BS j) the corresponding delay value is or is a function of an amount of time between a Time of Arrival, TOA, of a signal received at BS i from BS j according to a clock of BS i and a time reference at BS i; obtaining (902) Time Difference of Arrival, TDOA, measurements for different pairs of base stations (BS i, BS j) made by the wireless communication device (212); and computing (904) an estimate of the position of the wireless communication device (212) based on: (a) the TDOA measurements, (b) the delay values received for the different pairs of base stations (BS i, BS j) for which the TDOA measurements were made, and (c) known propagation delays for the different pairs of base stations (BS i, BS j) for which the TDOA measurements were made.

Embodiment 24: The method of embodiment 23 wherein computing (904) the estimate of the position of the wireless communication device (212) comprises: for each of the TDOA measurements, adjusting the TDOA measurement based on the delay value received for the corresponding pair of base stations (BS i, BS j) and the known propagation delay for the corresponding pair of base stations (BS i, BS j); and computing the estimate of the position of the wireless communication device (212) using the adjusted TDOA measurements.

Embodiment 25: The method of embodiment 24 wherein adjusting the TDOA measurement comprises subtracting the delay value received for the corresponding pair of base stations (BS i, BS j) and the known propagation delay for the corresponding pair of base stations (BS i, BS j) from the TDOA measurement.

Embodiment 26: The method of any of embodiments 23 to 25 wherein the known propagation delays are known Line of Sight, LOS, propagation delays for the different pairs of base stations (BS i, BS j) for which the TDOA measurements were made.

Embodiment 27: The method of any of embodiments 23 to 25 wherein the known propagation delays are known first arrived path propagation delays for the different pairs of base stations (BS i, BS j) for which the TDOA measurements were made.

Embodiment 28: The method of any of embodiments 23 to 27 wherein the signal received at BS i from BS j is a Positioning Reference Signal, PRS.

Embodiment 29: The method of any of embodiments 23 to 27 wherein the signal received at BS i from BS j is a data signal.

Embodiment 30: The method of any of embodiments 23 to 29 wherein the positioning estimation entity is a location server.

Embodiment 31: The method of any of embodiments 23 to 29 wherein the positioning estimation entity is the wireless communication device (212).

Embodiment 32: The method of any of embodiments 23 to 31 wherein the time reference at BS i is a time of transmission of a transmitted signal by BS i according to the clock of BS i.

Embodiment 33: The method of embodiment 32 wherein the transmitted signal is a Positioning Reference Signal, PRS.

Embodiment 34: The method of embodiment 32 or 33 wherein the delta value is a difference between the time of transmission of the transmitted signal by BS i according to the clock of BS i and the TOA of the received signal at BS i according to the clock of BS i.

Embodiment 35: The method of any of embodiments 23 to 31 wherein the time reference at BS i is a start of a downlink radio frame at BS i, a start of a downlink subframe at BS i, a start of a downlink slot at BS i, or a start of a downlink symbol at BS i.

Embodiment 36: A network node adapted to perform the method of any one of embodiments 1 to 35.

Embodiment 37: The network node of embodiment 36 wherein the network node comprises: an interface (1108, 1208, or 1110); and processing circuitry associated with the interface (1108, 1208, or 1110), the processing circuitry configured to cause the network node to perform the method of any of embodiments 1 to 35.

Embodiment 38: A wireless communication device comprising: one or more transmitters; one or more receivers; and processing circuitry associated with the one or more transmitters and the one or more receivers, the processing circuitry configured to cause the wireless communication device to perform the method of any of embodiments 23 to 35.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a first base station in a radio access network of a cellular communications system, the method comprising:
   receiving, at the first base station, a signal transmitted by a second base station;
   estimating a Time of Arrival (TOA) of the received signal at the first base station according to a clock of the first base station;
   determining a delta value that is a function of an amount of time between the TOA of the received signal at the first base station according to the clock of the first base station and a time reference at the first base station; and either:
   (a) providing the delta value to a positioning estimation entity within the cellular communications system; or
   (b) using the delta value at the first base station to reduce a time synchronization error between the first base station and the second base station; or
   (c) passing the delta value to a User Equipment (UE).

2. The method of claim 1, wherein receiving the signal comprises receiving the signal via a Line of Sight (LOS) propagation path.

3. The method of claim 2, wherein the signal is a Positioning Reference Signal (PRS).

4. The method of claim 2, wherein the signal is a data signal.

5. The method of claim 2, wherein a propagation delay between the first base station and the second base station via the LOS propagation path is known a priori.

6. The method of claim 1, wherein receiving the signal comprises receiving the signal via a first arrived path of an identifiable reflected or diffracted path between the first base station and the second base station.

7. The method of claim 6, wherein a propagation delay between the first base station and the second base station via the first arrived path is known a priori.

8. The method of claim 1, wherein the signal is transmitted from the first base station using transmit beamforming.

9. The method of claim 1, wherein receiving the signal comprises receiving the signal using receive beamforming.

10. The method of claim 1, comprising providing the delta value to a positioning estimation entity within the cellular communications system.

11. The method of claim 10, wherein the positioning estimation entity is a location server.

12. The method of claim 10, wherein the positioning estimation entity is a wireless communication device.

13. The method of claim 10, wherein determining the delta value comprises determining the delta value in accordance with an original timing of the first base station.

14. The method of claim 1, comprising using the delta value at the first base station to reduce the time synchronization error between the first base station and the second base station.

15. The method of claim 14, wherein determining the delta value comprises setting the delta value to a value that reduces a time synchronization error between the first base station and the second base station.

16. The method of claim 1, wherein the time reference at the first base station is a time of transmission of a transmitted signal by the first base station according to the clock of the first base station.

17. The method of claim 16, wherein the delta value is a difference between the time of transmission of the transmitted signal by the first base station according to the clock of the first base station and the TOA of the received signal at the first base station according to the clock of the first base station.

18. The method of claim 1, wherein the time reference at the first base station is a start of a downlink radio frame at the first base station, a start of a downlink subframe at the first base station, a start of a downlink slot at the first base station, or a start of a downlink symbol at the first base station.

19. A first base station for a radio access network of a cellular communications system, the first base station comprising:
   processing circuitry in communication with a transceiver, the processing circuitry configured to cause the first base station to:
   receive, at the first base station, a signal transmitted by a second base station;
   estimate a Time of Arrival, (TOA) of the received signal at the first base station according to a clock of the first base station;
   determine a delta value that is a function of an amount of time between the TOA of the received signal at the first base station according to the clock of the first base station and a time reference at the first base station; and
   either (a) provide the delta value to a positioning estimation entity within the cellular communications system or (b) use the delta value at the first base station to reduce a time synchronization error between the first base station and the second base station or (c) pass the delta value to a User Equipment (UE).

20. A method performed by a positioning estimation entity in a cellular communications system for determining an estimate of a position of a wireless communication device, the method comprising:
   receiving, from a plurality of base stations in a radio access network of the cellular communications system, a plurality of delay values each being a delay value for a different pair of base stations (BS i, BS j), wherein for each pair of base stations (BS i, BS j) the corresponding delay value is a function of an amount of time between a Time of Arrival, TOA, of a signal received at BS i from BS j according to a clock of BS i and a time reference at BS i;

obtaining Time Difference of Arrival, TDOA, (TDOA) measurements for different pairs of base stations (BS i, BS j) made by the wireless communication device; and computing an estimate of the position of the wireless communication device based on: (a) the TDOA measurements, (b) the delay values received for the different pairs of base stations (BS i, BS j) for which the TDOA measurements were made, and (c) known propagation delays for the different pairs of base stations (BS i, BS j) for which the TDOA measurements were made.

21. The method of claim 20, wherein computing the estimate of the position of the wireless communication device comprises:

for each of the TDOA measurements, adjusting the TDOA measurement based on the delay value received for the corresponding pair of base stations (BS i, BS j) and the known propagation delay for the corresponding pair of base stations (BS i, BS j); and computing the estimate of the position of the wireless communication device using the adjusted TDOA measurements.

22. The method of claim 21, wherein adjusting the TDOA measurement comprises subtracting the delay value received for the corresponding pair of base stations (BS i, BS j) and the known propagation delay for the corresponding pair of base stations (BS i, BS j) from the TDOA measurement.

23. The method of claim 20, wherein the known propagation delays are known Line of Sight, LOS, (LOS) propagation delays for the different pairs of base stations (BS i, BS j) for which the TDOA measurements were made.

24. The method of claim 20, wherein the known propagation delays are known first arrived path propagation delays for the different pairs of base stations (BS i, BS j) for which the TDOA measurements were made.

* * * * *